United States Patent
Ruuttu et al.

(10) Patent No.: US 6,797,214 B1
(45) Date of Patent: Sep. 28, 2004

(54) METHOD AND APPARATUS FOR TREATING INJECTION-MOULDED OBJECTS IN A PRODUCTION PROCESS

(75) Inventors: Jari Ruuttu, Billnäs (FI); Filip Törnroos, Turku (FI)

(73) Assignee: IT Innovations Finland Oy, Vantaa (FI)

( * ) Notice: Subject to any disclaimer, the term of this patent is extended or adjusted under 35 U.S.C. 154(b) by 100 days.

(21) Appl. No.: 10/148,074

(22) PCT Filed: Nov. 27, 2000

(86) PCT No.: PCT/FI00/01033

§ 371 (c)(1),
(2), (4) Date: May 28, 2002

(87) PCT Pub. No.: WO01/38064

PCT Pub. Date: May 31, 2001

(30) Foreign Application Priority Data

Nov. 26, 1999 (FI) .................................................. 992531

(51) Int. Cl.$^7$ ........................... B29C 45/14; B29C 45/40
(52) U.S. Cl. ........................ 264/161; 264/138; 264/163; 264/250; 264/251; 264/277; 264/297.2; 425/121; 425/123; 425/308; 425/404
(58) Field of Search ................................. 261/132, 138, 261/139, 145, 154, 157, 163, 250, 251, 254, 259, 263, 275, 277; 425/121, 122, 123, 126.1, 129.1, 289, 308, 315, 316, 404

(56) References Cited

U.S. PATENT DOCUMENTS

| | | | | |
|---|---|---|---|---|
| 3,897,192 A | * | 7/1975 | Heimberger et al. | ........ 425/391 |
| 4,008,302 A | | 2/1977 | Erlichman | |
| 4,636,347 A | * | 1/1987 | Kato | ........................... 264/251 |
| 4,786,454 A | * | 11/1988 | Oddenino | .................... 264/157 |
| 4,806,405 A | * | 2/1989 | Liebl | ........................... 428/52 |
| 4,830,809 A | * | 5/1989 | Liebl et al. | .................. 264/257 |
| 4,921,671 A | * | 5/1990 | Staheli | ....................... 264/145 |
| 5,028,225 A | * | 7/1991 | Staheli | ....................... 425/122 |
| 5,478,051 A | | 12/1995 | Mauer | |

FOREIGN PATENT DOCUMENTS

| | | |
|---|---|---|
| EP | 0 770 806 A1 | 5/1997 |
| WO | 98/13186 | 4/1998 |

* cited by examiner

Primary Examiner—Angela Ortiz
(74) Attorney, Agent, or Firm—Burns, Doane, Swecker & Mathis, L.L.P.

(57) ABSTRACT

A method for treating workpieces (307, 801, 802, 803) to be injection moulded in a production process comprises a step for forming a workpiece (307, 801, 802, 803) by injection moulding so that during the injection moulding, the workpiece is fastened to a given elongated transport arrangement (301, 302, 304, 305, 306). The workpiece (307, 801, 802, 803) is moved forwards in the production process by means of the elongated transport arrangement (301, 302). Subsequently the fastening (311) of the workpiece (307, 801, 802, 803) is partly detached from the elongated transport arrangement (305, 306) and the workpiece (307, 801, 802, 803) is fastened, supported by the fastening remaining between itself and the transport arrangement, into a position where it is substantially outside a plane (800) defined by the transport arrangement.

24 Claims, 8 Drawing Sheets

METHOD AND APPARATUS FOR TREATING INJECTION-MOULDED OBJECTS IN A PRODUCTION PROCESS

The invention relates generally to serial production of workpieces by injection moulding and to their treatment subsequent to the injection-moulding step of the production process. The invention relates specifically to the combination of the workpieces and the arrangement made for their transport so as to allow versatile handling of the workpieces.

Figure 1:
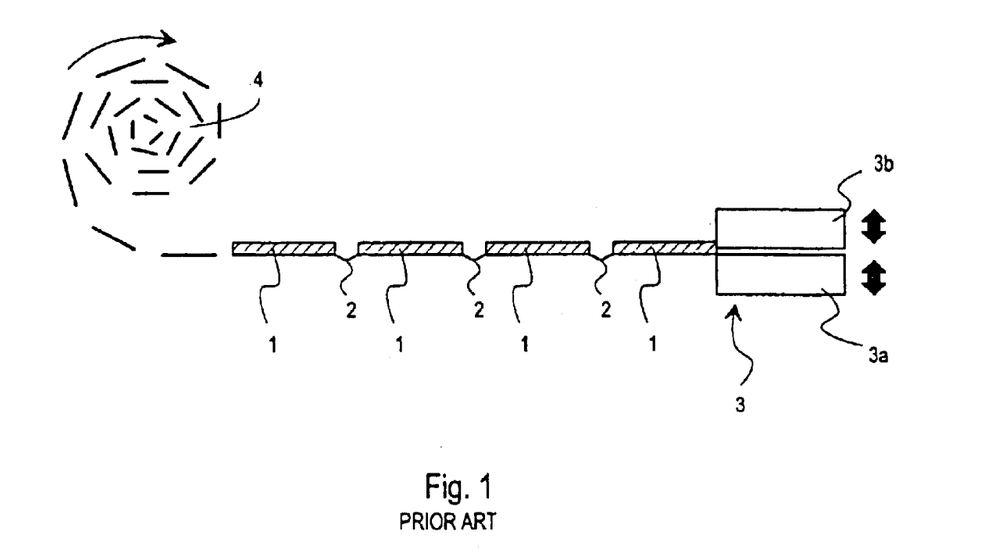
FIG. 1 shows a conventional arrangement for forming a band of work pieces.

Finnish Patent Application No 963873 discloses a production process and apparatus, in which semi-finished workpieces are connected in succession and possibly also in parallel by connecting bridges. FIG. 1 shows how the workpieces produced in a given production step from an elongated continuous band, which is wound up in a roll 4. Regarding the example of the figure, it is conceivable that the raw material used is injection-moulded plastic and the products 1 to be prepared are small plastic objects. For the successive objects not to be detached, the jaws of the clamp in FIG. 3 have been shaped so that the "rear end" (right-hand end in the figure) of each workpiece will comprise a small plastic tongue, which is superfluous in terms of the shape intended for the product. When the following workpiece is injection moulded, a small plastic tongue will also be formed at its "front end" (left-hand end in the figure), the tongue being superfluous in terms of the shape intended for the product and being fastened by melting to the tongue at the rear end of the preceding workpiece. A bridge 2 made of the same material as the actual work-pieces will be formed between the successive workpieces.

Figure 2:
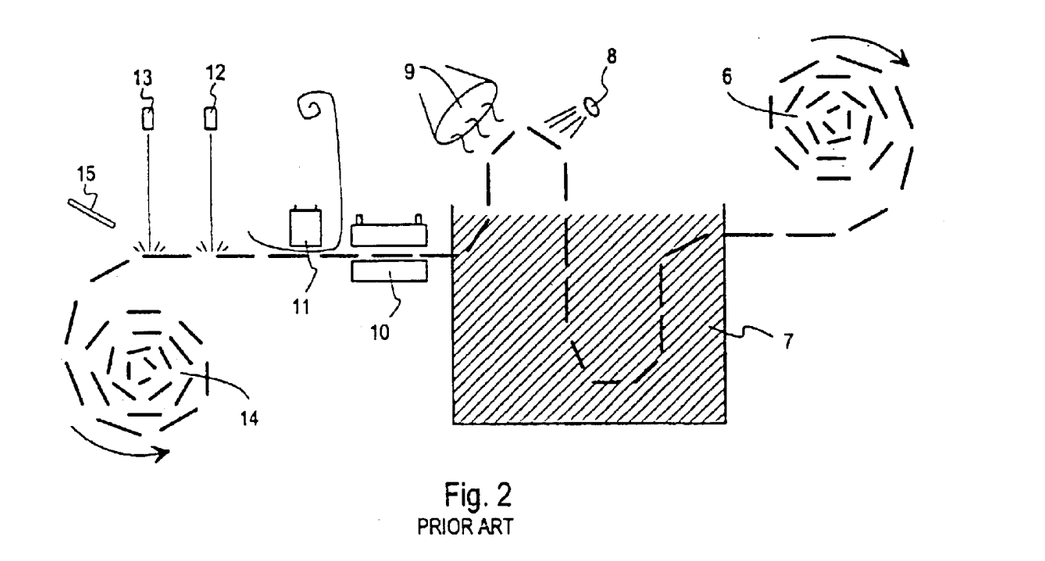
FIG. 2 shows conventional surface treatment of a band of workpieces.
Figure 3:
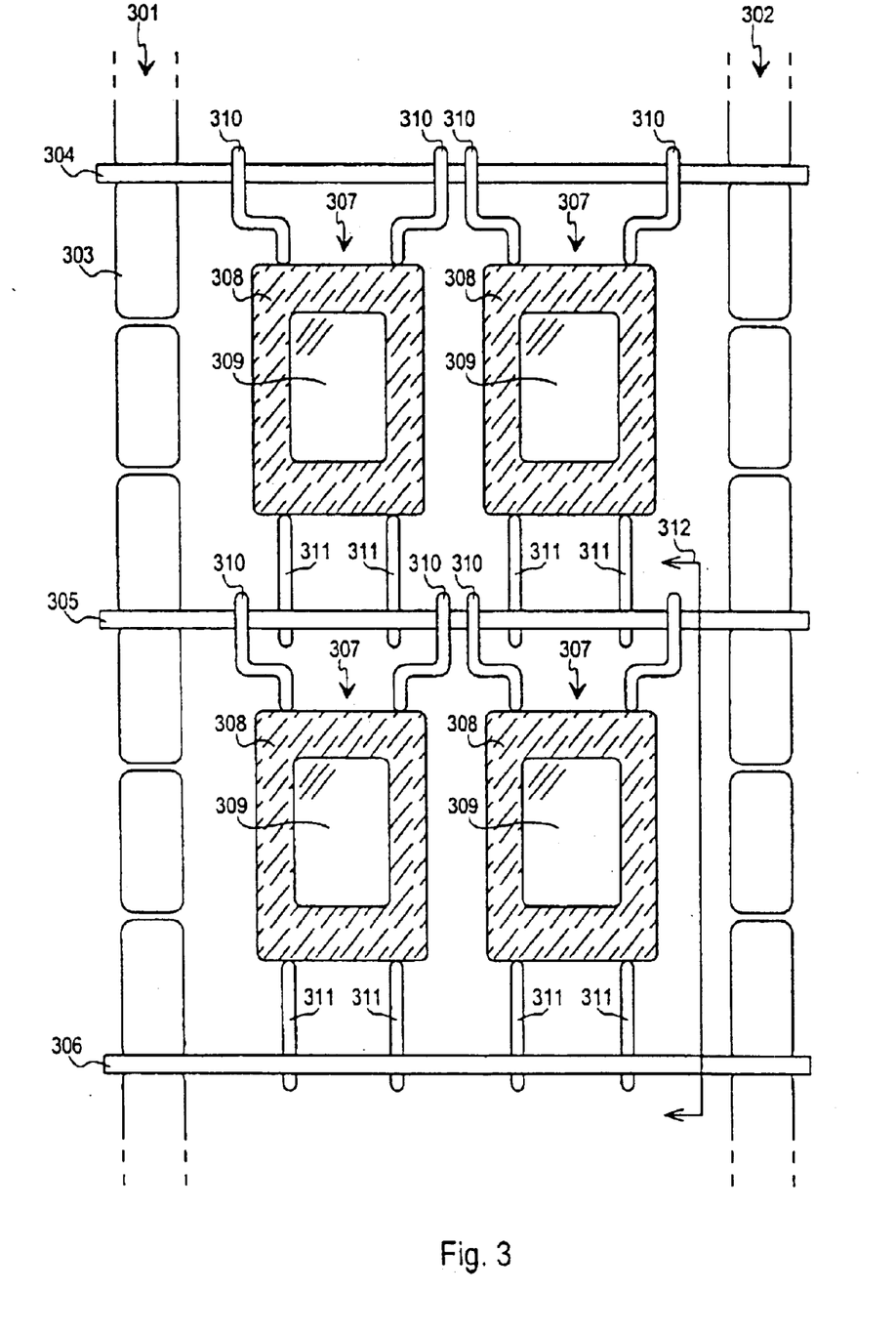
FIG. 3 shows an arrangement of the invention.

FIG. 2 illustrates the surface treatment included in the same production process. The band formed of workpieces is brought to the surface treatment wound up as a roll 6. The workpieces are guided as a band to a dip varnishing basin 7, and from there on to surface paint spraying 8 and to a drying machine 9. Other surface treatment steps given by way of example and illustrated in FIG. 3 are printing 10, gluing 11 of a sticker or a label, and laser production 12 of an identifying pattern. Two optional operations are presented as the last step in the figure. In the first option, the laser cutter 13 separates the workpieces 15 from the band, and after this they have to be handled as individual pieces in general. In the second option, the finished workpieces are further wound up as a roll 14 or bent into a pile, allowing them to be readily transported and placed in the assembly step of a more complex product.

Nonetheless, the prior art method described above has proved awkward in the practice, because the bridges made of injection-moulded material and connecting the successive workpieces do not withstand all process steps properly. In addition, they limit the handling of the band of workpieces in some process steps.

The typical feature of production methods based on solidification of a liquid or a viscous production material is that the material is guided to the desired locations of the mould through one or more "pouring channels". In the solidification step, there is still material in the pouring channels, and thus this portion of the material will form a sprue. The actual workpiece and the sprue are connected by a thin material bridge at the point where the pouring channel has been connected to the mould of the workpiece proper. The sprue is often utilised in the further processing of the workpiece, because e.g. surface treatment intended to cover the entire workpiece surface is easy to carry out by holding the sprue. U.S. Pat. No. 5,478,051 discloses a method in which the plastic parts to be injection moulded, after having been pressed, form a band, in which a separate reinforcing wire passes through the sprues and connects successive parts. The publication describes both embodiments in which the wire consists of the same material as the injection-moulded pieces and embodiments in which the wire is e.g. a metal wire. Similar solutions are disclosed in patent specifications U.S. Pat. Nos. 4,008,302 and 3,192,298.

However, the solutions above are disadvantageous in terms of their manufacturing techniques, because they cannot be subjected to, say, dip varnishing, without the band assisting also in the transport or any other auxiliary equipment being immersed in varnish. Thus, the auxiliary equipment will usually be fit for use only once, because recycling of the equipment would result in detrimental varnish accumulation in the apparatus.

The object of the present invention is a method and an apparatus for producing injection-moulded workpieces so as to allow versatile further processing of the workpieces without a disposable transport arrangement. Another object of the invention is to allow the workpieces to be exactly aligned in the different steps of the production process.

The objects of the invention are achieved by providing the workpieces with fasteners enabling them to be connected to the transport arrangement so that the fastening can be partly released, and then the partly released fasting allows the workpiece to be shifted in at least two different positions relative to the transport arrangement.

The method of the invention comprises steps for
a) forming the workpiece by injection moulding so that the workpiece is fastened to a given elongated transport arrangement during the injection moulding
b) moving the workpiece forwards in the production process by means of the elongated transport arrangement.

The method is characterised by comprising steps for
c) partly releasing the fastening of the workpiece from the elongated transport arrangement
d) shifting the workpiece supported by the remaining fastening between itself and the transport arrangement into a position where it is substantially outside the plane defined by the transport arrangement The invention also relates to an apparatus comprising
a mould for producing workpieces by injection moulding
an elongated transport arrangement for moving the injection-moulded workpieces forward in the production process;
the apparatus having a mould disposed to form fastening members in the workpieces for fastening the workpieces to the transport arrangement.

The method is characterised by comprising
means for partly releasing the fastening of the workpieces from the transport arrangement
means for shifting a workpiece whose fastening to the transport arrangement has been partly released into a position relative to the transport arrangement, where it is located substantially outside a plane defined by the transport arrangement In accordance with the invention, fastening members are formed in the workpieces during the injection moulding to connect the workpieces with the transport arrangement, which is intended to transfer the workpieces between the different steps of the production process. At least part of the fastening members are made removable. Removable fastening members can also be formed so that they can be refastened after having been unfastened. When all the fastening members are fastened, the workpieces have a specific first position relative to the transport arrangement. In this position they are easy to align accurately in a given step of the production process, because the fastening members, any separate aligning members connected with these, and the parts of the transport arrangement to which the fastening members are fastened, can be used as mechanical aligning means.

When part of the fastening members have been unfastened, the workpiece can be turned into a second position while being supported by the remaining fastening members. The workpiece can be conceived as substantially planar, and then the direction of its plane in the first position is substantially the same as the direction of a given plane defined by the transport arrangement. In the second position, the workpiece can be turned so that the direction of its plane deviates notably from the direction of the plane defined by the transport arrangement. If the fastened fastening members are at a given edge of the workpiece, the workpiece will in its second position, be principally located quite far from the plane defined by the transport arrangement, and can then be e.g. immersed in a vessel containing a surface treatment agent without the transport arrangement getting into contact with this surface treatment agent.

The transport arrangement considered most advantageous comprises one or more band-like or chain-like conveyors forming a closed loop. The conveyor is called a chain for the sake of conciseness. At regular intervals the one or more chains are provided with attachment points, and at each of these a given axis can be fastened. The transport arrangement and the injection-moulding mould are mutually positioned such that when the mould is closed, at least one was will remain within it. Thus fastening members are formed on the injection-moulded workpiece to attach this to at least one axis. It is preferable to fasten the injection-moulded workpiece to two successive axes, and then at least the fastening members attached to one of the axes will be removable. When the fastening is released from one axis, the workpiece will remain supported by the other axis, and can then be rotated about this axis into the desired position.

The invention is described below in greater detail with reference to the preferred embodiments given by way of example and to the enclosed figures, in which.

The prior art description above refers to FIGS. 1 and 2, and thus the following description of the invention and its preferred embodiments will refer mainly to FIGS. 3–17. In the figures, the same reference numerals will be used for mutually corresponding members.

FIG. 3 is a schematic view of two parallel conveyor chains 301 and 302. The chains are mutually parallel and they consist of a plurality of successive, mutually identical loops 303. Axes transverse to the longitudinal direction of the chains have been connected to the chains, with axes 304, 305 and 306 appearing in FIG. 3. The distance between two successive axes is substantially constant. The arrangement for fastening the axes to the chains is illustrated in greater detail below.

FIG. 3 further shows four mutually identical workpieces, which have been made by injection moulding. By way of example, it is assumed in FIG. 3 that each workpiece is intended for the production of a protective window for the display of a small-sized electronic device. To this end, each workpiece has a service member 307, in which the darkened margin 308 surrounds the transparent central part 309. To fasten the service members to the axes, each workpiece comprises two upper fastening members 310 and two lower fastening members 311. The fasting members are connected with the service members by a narrow bridge; the final product no longer comprises any fastening members, since these are detached from the service member in an ultimate production process step by breaking the bridge connecting the fastening member and the service member.

Figure 4:
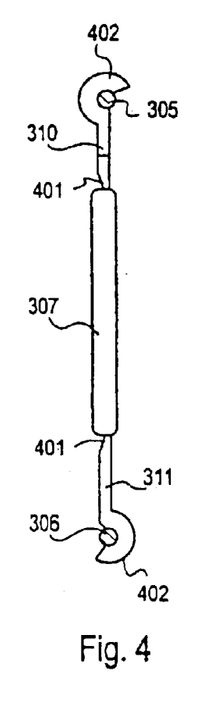
FIG. 4 is a lateral view of the workpiece of the invention.

FIG. 4 shows a workpiece viewed in the direction indicated by the arrow 312 in FIG. 3. FIG. 4 shows a first axis 305, a second axis 306, a service member 307, an upper fastening member 310, a lower fastening member 311 and a narrow bridge 401 connecting the fastening member and the service member. FIG. 4 also shows a preferred design of the fastening members: each fastening member comprises at its end facing the axis a hook 402, which encloses the axis partly. The fact that the upper fastening member 310 encloses the axis from a different side than the lower fastening member 311 has no limiting impact on the invention, however, it yields a number of advantages described below. In this patent application, the terms "upper" and "lower", and also the other expressions of direction, are merely intended to illustrate the parts better in the accompanying figures, and they have no limiting impact in terms of the invention.

Figure 5A:
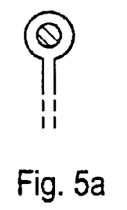
FIGS. 5a–5c show a number of optional fastener designs.
Figure 5B:
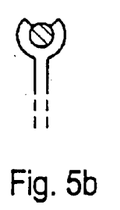
Figure 5C:
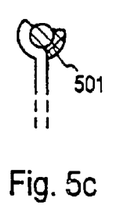

Instead of the hook shape shown in FIG. 4, the end of the fastening member which is connected with the axis can be shaped in other ways as well. FIGS. 5a–5c show a number of optional embodiments: FIG. 5a shows a sleeve-like shape encircling the axis completely, which must be at least partly broken at the stage of detaching the fastening member from the axis. FIG. 5b shows a fork-like design, in which the fastening member encloses the axis partly from two sides. FIG. 5c shows a variant of the fork-like embodiment, in which one branch 501 of the fork is made shorter and weaker than the other one, and can thus be cut off while the other branch remains. The remaining branch can be dimensioned with a relatively great length, thus forming a relatively solid fastening even by itself.

Figure 6A:
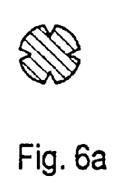
FIGS. 6a–6d show a number of optional cross-sections of the axis.
Figure 6B:
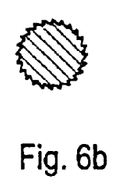
Figure 6C:
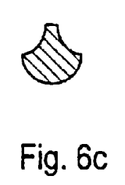
Figure 6D:
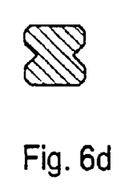
Figure 7A:
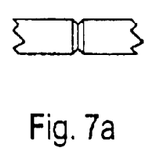
FIGS. 7a–7f show a number of fastening designs of the axis.
Figure 7B:
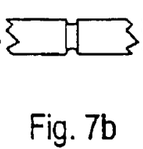
Figure 7C:
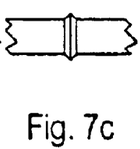
Figure 7D:
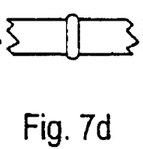
Figure 7E:
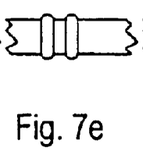
Figure 7F:
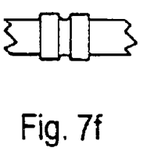

The axis does not have to be circular in cross-section, nor does it need to be constant in cross-section over the total length of the axis. FIGS. 6a–6d show a number of optional cross-sections of the axis, which can be used either over the total length of the axis, or, for instance, only at the points of the axis where the axis is connected with the chains, or at the points where the fastening members of the workpieces are connected with the axis. FIG. 6a shows an axis which is mainly round but notched at regular intervals, FIG. 6b shows an axis toothed over its entire circumference, FIG. 6c shows a notched axis, and FIG. 6d shows a notched axis which is substantially square in cross-section.

The axis may comprise designs at its different locations which are intended to assist in maintaining the axis in position in the longitudinal direction relative to the chains and/or to maintain the fastening members pertaining to the workpieces in position relative to the longitudinal direction of the axis. FIGS. 7a–7f show a number of such exemplifying designs, i.e. various notches, embossments and combinations of these.

The axis may be fastened to the chains either by a removable or a stationary connection. With a view to the manoeuvrability of the workpiece, the axis is preferably fastened to the chains so as to be freely rotatable about its longitudinal axis. When the fastening of the workpiece to the axes has thus been partly detached and the workpiece is shifted into a different position relative to the transport arrangement, the rotation may occur either in the connection between the fastening member and the axis, or in the connection between the axis and the chain, depending on which connection has lower friction. The chain loops may be connected by a special connecting member provided with a hole or a notch for the axis, or part of the chain loops may be so small that their central opening leaves only a passage of exactly the size of the cross-section of the axis for this to pass.

Speaking of chains, it should be noted that in terms of the invention, the only criteria for a "chain" are an elongated shape and the possibility for axes to be fastened at regular intervals. The "chains" may be e.g. bands, to which transverse bushings have been fastened at regular intervals by gluing or any other known method to receive inserted axes.

Figure 8:
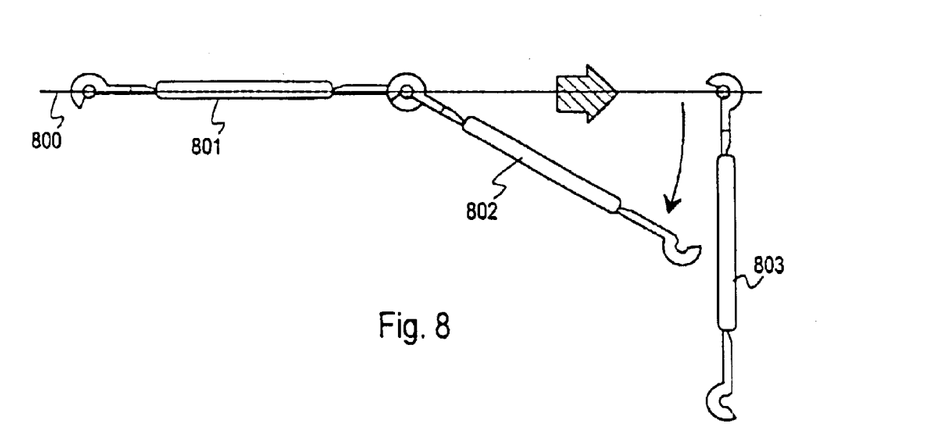
FIG. 8 shows the turning of the workpiece relative to the transport arrangement.

FIG. 8 shows a step of the production process which makes benefit of the partial detachment of the workpieces from the transport arrangement. The plane defined by the transport arrangement, i.e. the chain plane, is illustrated by the broken line 800, and the direction of movement of the transport arrangement is indicated with a dashed arrow. A given first workpiece 801 is still attached to the axes at both ends. A given second workpiece 802 has just been partly detached by its lower fastening members having been ejected from the axis. Owing to the hook shape of the fastening members and to the adequate elasticity of the raw material, a given fastening member can be "snapped" out from the axis and, whenever necessary, inserted in the axis again by "snapping". When the lower fastening members of the workpiece 802 have been detached, the workpiece can be shifted into another position relative to the plane 800 defined by the transport arrangement. The shift is illustrated with a curved arrow. In FIG. 8, the third workpiece 803 has been turned in a position in which the plane defined by the workpiece forms an angle of substantially 90 degrees to the plane 800 defined by the transport arrangement. In such a position, the workpiece 803 can be varnished or subjected to any other surface treatment without being immersed into the vessel containing the surface-treatment agent. Since the service member is relatively far from the chains, these will not be dipped in the surface-treatment agent.

FIG. 8 shows particularly that partial detachment implies detachment specifically of the lower fastening members from the axis, i.e. the front fastening members viewed in the direction of movement of the workpieces. However, the invention does not involve any limitations in this respect, and hence partial detachment can take place in the way best suited for each situation. Varying partial detachments can be performed in the different process steps.

Figure 9:
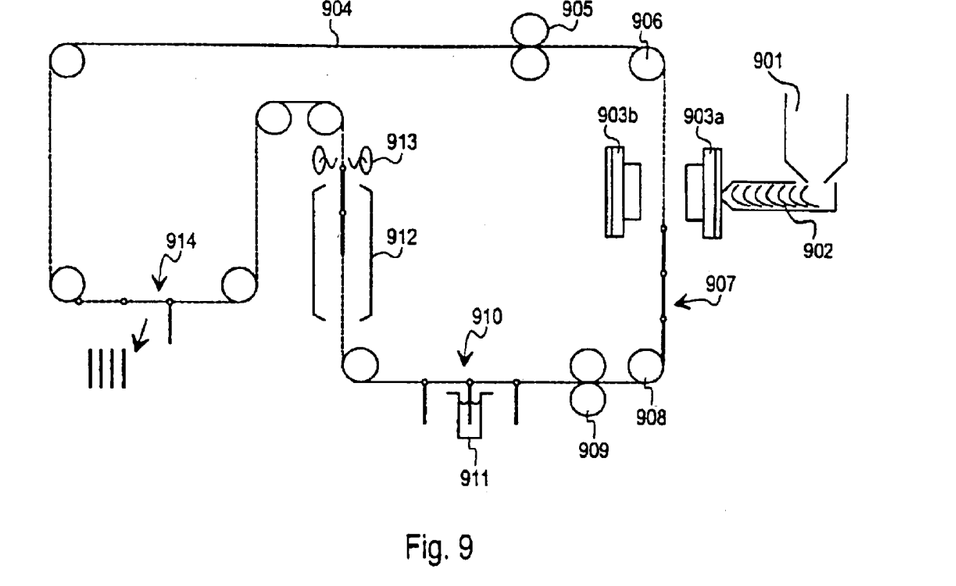
FIG. 9 shows a production process in accordance with the invention.

FIG. 9 is a schematic view of a production process using the solutions described above. The plastic raw material is fed through a plastication unit 901 and a squeezer 902 into a mould, which consists of a first half 903a and a second half 903b. The mould halves are movable relative to one another. For the injection-moulding step, they are pressed together, and are subsequently separated, and then the injection-moulded workpiece can be detached from the mould and removed for the subsequent injection-moulding step. The chains 904 form a closed loop, which is fed to the location of the mould by means of aligning and clamping rolls 905 and 906. As noted above, the chains themselves do not usually pass through the mould (even if the invention as such does not exclude such an option), but in a system of two chains, these pass on either side of the mould, and thus only a given number of axes fastened between the chains will remain within the mould during the injection-moulding step.

Step 907 shows a band formed by injection-moulded workpieces. At this stage, the workpieces are fastened to the axes at both ends. At the roll 908, a detaching unit 909 is provided, in which specially designed rolls detach the fastening of one end of each workpiece. In step 910, the workpieces are suspended from the transport arrangement by one end only, and are thus easily subjected to surface treatment by dipping them into a vessel 911. After this, the workpieces may be either allowed to be still suspended only by one end, or the fastening which has been undone in step 909 can be refastened. Even without refastened, under the force of gravity, the workpieces will be aligned with the plane defined by the transport arrangement in such ulterior production process steps where this plane is vertical.

FIG. 9 shows the subsequent processing steps of drying 912 and ultraviolet curing 913 of the surface-treatment agent. In step 914, the workpieces are totally removed from the transport arrangement and the chains with their axes start recirculating towards the mould. If the axes are notably fouled during the process, a step can be added between steps 914 and 905, in which the axes are removed, and are either cleaned and refastened to the chains, or replaced with new, clean axes.

The force of gravity can be utilised also otherwise to carry out the fastening between the workpiece and the axes. The fastening member intended to be detached in a given subsequent production process step may consist merely of a projection lying on the axis when the workpiece and the transport arrangement are in a position where the force of gravity exerted on the workpiece presses this projection against the axis. As the transport arrangement subsequently turns into a different position, e.g. upwards-down compared with the previous position, the workpieces will drop into a position where they are suspended from the axis that provides better attachment e.g. with hooks of the shape discussed above.

Figure 10A:
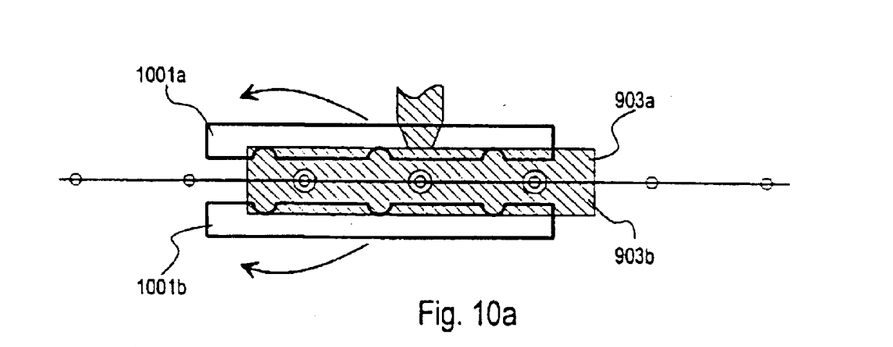
FIGS. 10a–10b show an operation of the transport jaws in the apparatus of the invention.
Figure 10B:
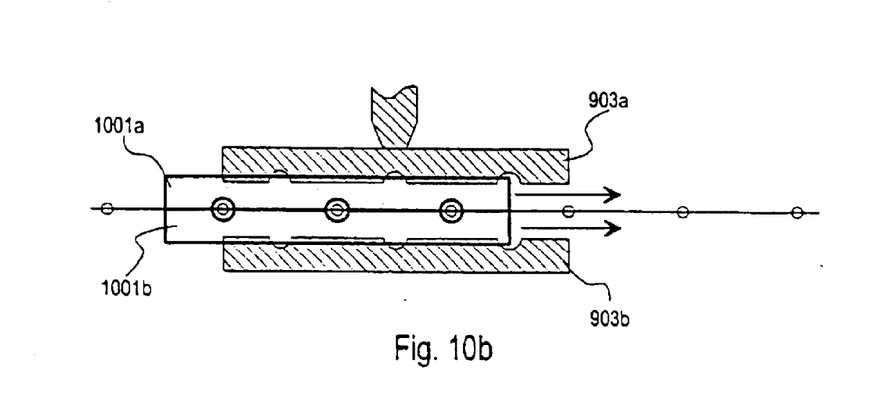

FIGS. 10a and 10b show a preferred embodiment for performing the mechanical transfer of the transport arrangement at the injection mould. The mould consists of two halves 903a and 903b, which have been pressed together for the duration of the injection moulding in FIG. 10a. One injection-moulding step usually lasts some seconds. Meanwhile, the transfer jaws 1001a and 1001b move backwards over a given distance: the length of the displacement equals the distance over which the transport arrangement should move between two successive injection-moulding steps. When the injection-moulding step has ended and the injection-moulded workpiece is sufficiently solidified, the mould halves are opened as shown in FIG. 10b. While the mould halves are being opened, the transferjaws 1001a and 1001b are pressed around the chains and/or axes, and after this the transfer jaws move the assembly formed by chains, axes and workpieces forwards.

Usually the body to be injection moulded is provided with ejection pins made of the same material as the remaining body and directed directly into either one of the mould halves. This mould half is usually the one which does not communicate with the plastication unit and through which no raw material is thus squeezed (lower mould half 903b in FIG. 10). Under the action of the ejection pins, the workpiece will remain attached to the mould half facing the ejection pin as the mould is being opened. This mould half is connected with an operative detaching unit which ejects the workpiece from the mould by means of the ejection pins. The movement of the transferjaws 1001a and 1001b shown in FIG. 10 is preferably synchronised with the opening of the mould and the operation of the detaching unit (not shown in the figure), so that, while the detaching unit is ejecting the ejection pins, the transfer jaws, or at least the jaw located on the same side of the mould as the detaching unit, pushes the axes over the same distance and in the same direction. In this situation, the movement of the transfer jaws contribute to the removal of the workpiece from the mould, and no unnecessary mechanical stains will be exerted on the workpiece in the step where it is removed from the mould.

Figure 11A:
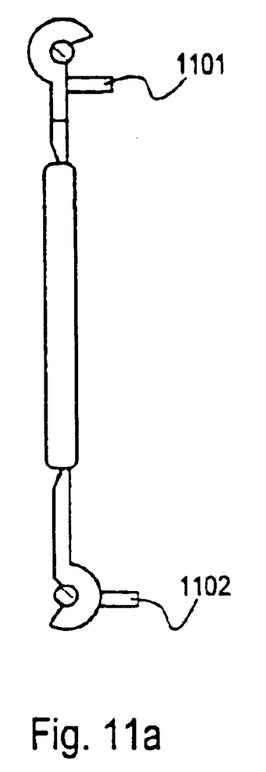
FIGS. 11a–11b show a number of workpiece details.
Figure 11B:
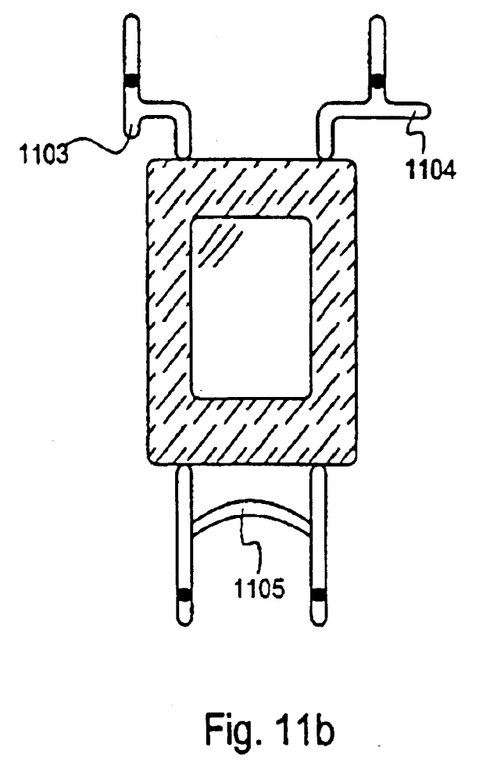

The ejection pins are preferably located in the fastening members of the workpiece, since they are not intended to remain the final workpiece. FIGS. 11a and 11b show preferred ways of placing the ejection pins 1101 and 1102 in the fastening members. The fastening members may also comprise other mechanical designs 1103, 1104 and 1105 which contribute to the alignment of the workpiece in any subsequent process step.

The description above does not take any stand to which way the raw material is introduced in the workpiece. The material to be injection moulded flows into the mould from the plastication unit through a given pouring channel. The positioning of the pouring channel relative to the one or more workpieces can notably influence the quality of the products prepared in the process. Especially in the production of optical products, such as protective windows for displays, one must pay attention to even distribution of the material in the mould, optimally laminar material flow in the mould, absence of mechanical strains in the workpiece after injection moulding and to a flawless material surface.

Figure 12:
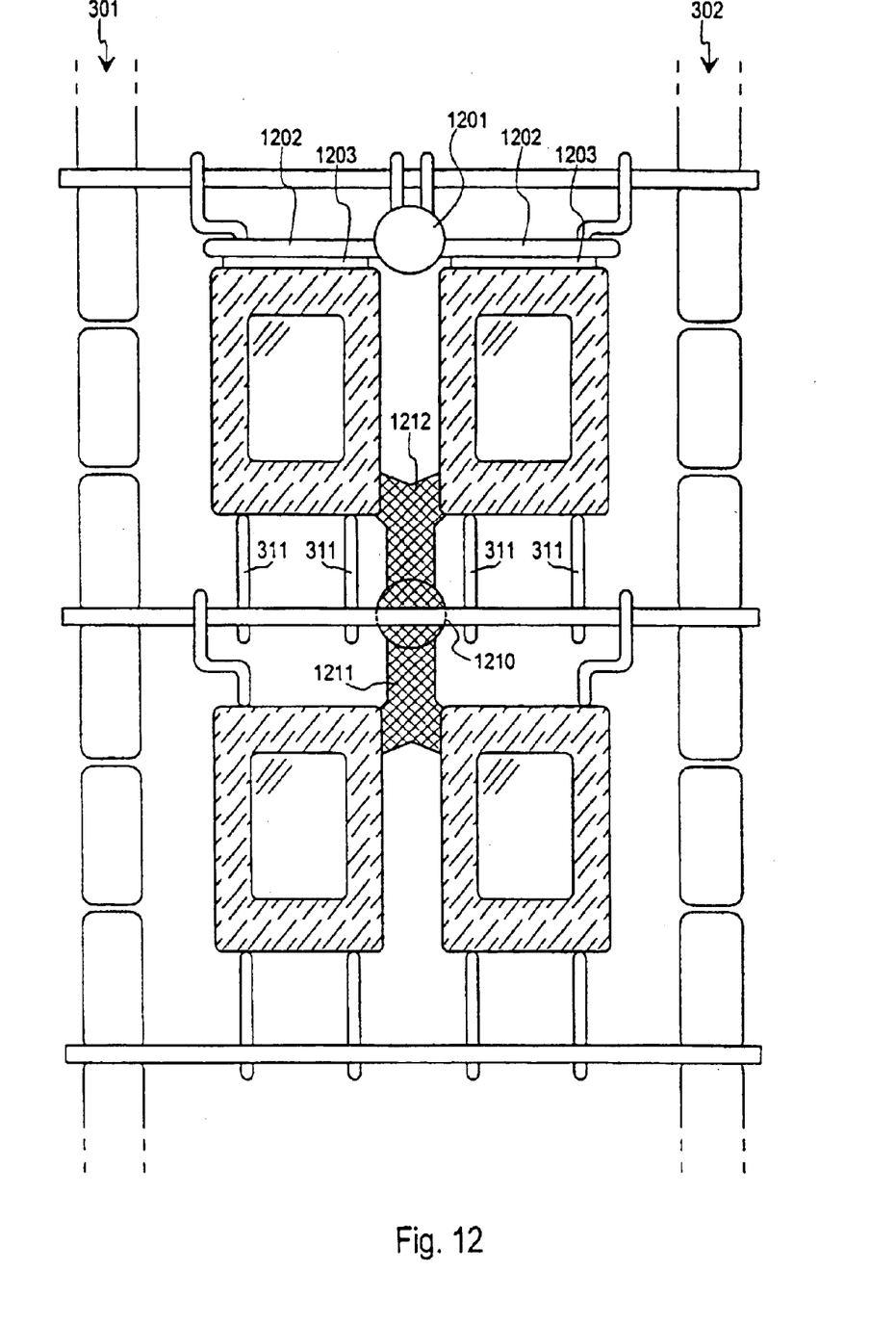
FIG. 12 shows a number of optional positions of the pouring channel

FIG. 12 shows two mutually optional positions of the pouring channel. The top of the figure shows the pouring channel 1201 located between two adjacent work-pieces, in the centre of the area defined by the chains 301 and 302. The material fed from the primary pouring channel first flows into the flow ducts 1202, relatively large in cross-section, for the material to fill them up completely before flowing through a plate-like secondary pouring channel 1203 to the actual service member. This arrangement provides a good laminar flow in the service member. The outermost end of the flow channel preferably extends beyond the secondary pouring channel to prevent the material which is coming from the very tip of the plastication unit and possibly has been oxygenated during the preceding injection-moulding step, or has otherwise altered properties, from flowing to the service member. It should also be noted that the workpieces have lower fastening members 311 at locations as far as possible from the point where the material flows to the service member. The lower fastening members 311 act as air pockets, through which the gaseous substances can escape from the mould and make way for the raw material. The material which has first flowed into the mould, and which may cause surface errors on the mould because it cools while flowing, also ends up in the lower fastening members 311. Here, at the lower fastening members, these errors will do no harm, because they will not remain in the final product, i.e. the service member.

The bottom of FIG. 12 shows an optional position 1210 of the pouring channel The pouring channel is now located in the middle of a group of four workpieces, and then four workpieces can be simultaneously produced in one single injection-moulding step. The material flows into the workpieces through channels 1211 and 1212. For the pouring channel at the axis not to impede the forming of the fastening members and the partial removal of the workpieces from the transport arrangement in subsequent production process steps, it is thus advantageous to use a "hot channel", and then no material will remain in the workpieces at the pouring channel 1210. The hot channel may be extended all the way to the service members, and then no material will remain at the channels 1211 and 1212 either. The material path disposed as a channel system 1210, 1211 and 1212 can also be formed such that the material first flows into a given flow channel and only from there through a given secondary pouring channel to the service member, so that the flow in the service member will be adequately laminar.

The transport arrangement based on axes, which may also use ejection pins for alignment, is perfectly suitable for multi-step injection moulding i.e. production processes in which a given workpiece is formed as a result of two or more separate injection-moulding steps. The application of the invention to an exemplifying two-step injection-moulding process is described below, where two-coloured protective windows for mobile phone displays are produced.

Figures 13A, 13B:
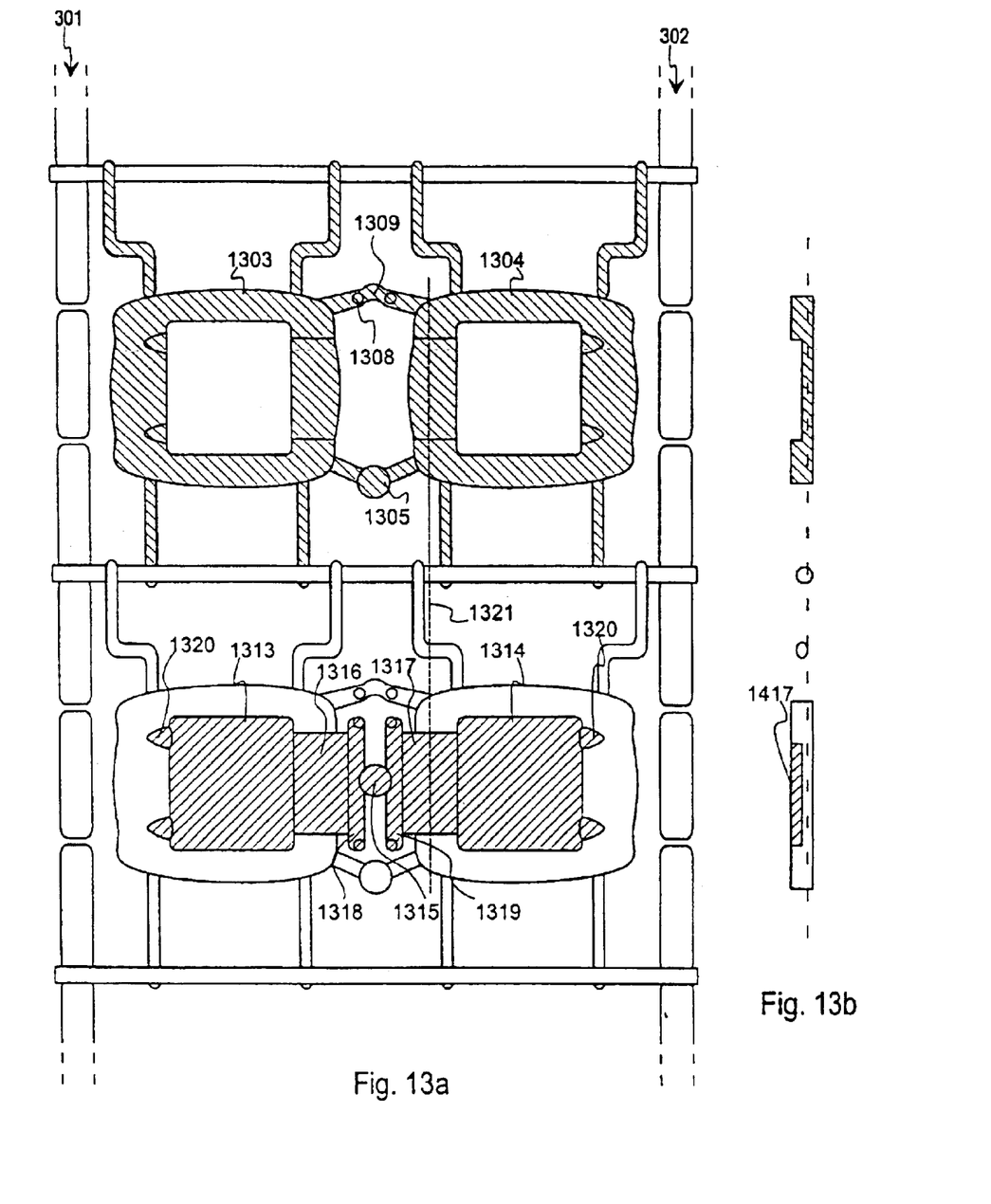
FIG. 13a shows the application of the invention to multi-step injection moulding.
FIG. 13b is a lateral view of some parts of the workpieces of FIG. 13a, FIG. 14 shows a detail in the processing of a colour film.

FIG. 13a shows two successive workpieces in a band of successive workpieces, where two chains 301 and 302 are used between the workpieces. The direction of movement of the band in the figure is from the top towards the bottom. The upper workpiece has been subjected to a first injection-moulding step and the lower workpiece has additionally been subjected to a second injection-moulding step. In the upper workpiece, the diagonal lines indicate the material injection-moulded in the first injection-moulding step, and in the lower workpiece, the inclined lines indicate the material injection-moulded in the second injection-moulding step.

The upper workpiece comprises two annular service members 1303 and 1304, into which material has been fed through a pouring channel 1305 located in the middle of the area defined by the support wires. The "background" of the mould, i.e. the portion through which no material is fed, also comprises recesses, which subsequently form the ejection pins 1308 in the workpiece. For the sake of simplicity, the figure shows but a small number of ejection pins, however, they may naturally be provided also in other parts of the workpieces.

In the lower workpiece, a continuous central portion 1313 and 1314 has been injection moulded within each annular service member formed in the first step. The material has been introduced in the central parts through a primary pouring channel 1315 in the middle of an area defined by the support wires, through secondary pouring channels. 1316 and 1317, and also through flow channels 1318 and 1319 located between these. At a given location of the edge of the annular service members, space has been reserved for the secondary pouring channels in the first injection-moulding step. Air pockets have been left at given locations of the edge of the annular service members also in the first injection-moulding step, and in the second injection-moulding step, tongues 1320 will be formed in these air pockets. The aim of using air pockets is to achieve the best optical quality possible in the central portion. The material typically used in the first injection-moulding step is non-transparent, and free space for the secondary pouring channels 1316 and 1317 and also for the air pockets 1320 will be left behind this material so that the material solidified in the secondary pouring channels and in the air pockets in the second injection-moulding step will be invisible. FIG. 13*b* shows a cross-sectional view of the workpieces in the plane indicated by the dashed line 1321.

Injection moulding is known as a process that allows the production of high-precision pieces. One result of this is that the ejection pins 1308 produced in the first injection-moulding step are perfectly suitable for aligning the workpiece exactly at the desired location for another injection-moulding step. On the other hand, the axes and the transfer jaws gripping these ensure that the workpieces can be very easily transferred from one injection-moulding step to another. The embodiment shown in FIG. 13*a* even allows complex nested moulds, rotation moulds or moulds reciprocating in linear movement between the process steps to be totally avoided, such moulds having been conventionally required in multi-step injection moulding. The method may use a mould with two cavities, whose upper cavity has been designed for producing annular service members in the first injection-moulding step and whose lower cavity has been designed for producing central portions in the second injection-moulding step. Of course, it is possible to use two separate moulds placed in succession in the process. The invention does not by any means restrict the number of successive injection-moulding steps in multi-step injection moulding, so that moulds with more cavities or a greater number of moulds can be used instead of a mould with two cavities or of two successive moulds.

The process in FIG. 13*a* can very easily be converted to single-step injection moulding by using a mould with two cavities (or two successive moulds with one single cavity), the cavities being identical and by moving the band of successive workpieces forwards over the distance of two workpieces after each injection-moulding operation. In terms of production techniques, it is very advantageous to be able to use the same injection-moulding machine for the production of different products by merely replacing the mould/moulds.

High-precision alignment is useful also in other kinds of production process steps. These steps include the attachment of colour films to workpieces or processing colour films fixed to bodies. A known method for combining a colour film with a product to be injection moulded is such in which the colour film is placed in the mould before the injection moulding and the injection-moulded material adheres to the colour film during solidification. The drawback of this method is that, although the colour film would comprise transparent areas in order to form transparent zones, say, in the protective window of a display, the friction between the film and the injection-moulded material and their different thermal expansion characteristics will impair the optical quality of the transparent area in the final product.

Figure 14:
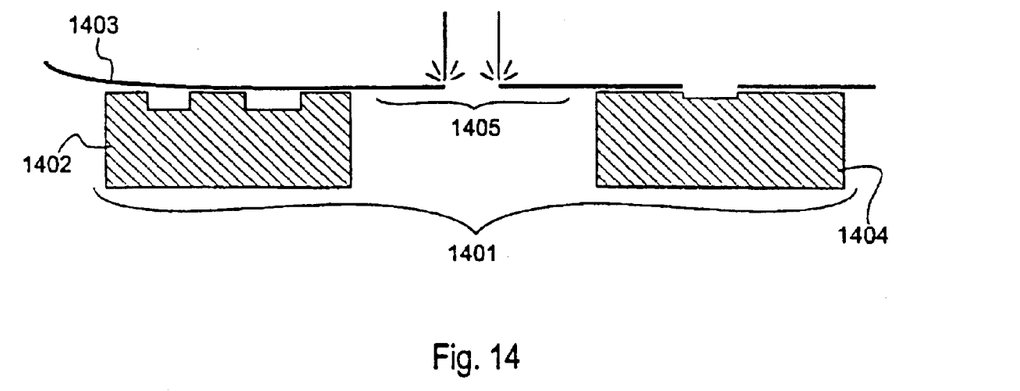

FIG. 14 is a schematic view of a mould 1401, whose size corresponds to a multi-step injection mould with three cavities. For the sake of clarity, the mould is shown only from the rear side, i.e. the side not facing the plastication unit. In the first cavity 1402, such parts of the workpiece are injection moulded on whose surface the colour film 1403 is intended to remain in the final product. For this purpose, the colour film 1403 is run in the mould as a continuous band in a manner known per se. In the third cavity 1404, such a part of the workpiece is injection moulded which is intended to be transparent, i.e. whose surface must not be covered, at least not by a colour film part in the finished product. However, the mould does not comprise any second, i.e. central cavity, but instead, in the area 1405, there is a laser cutting head, which by laser cutting removes the portion of the colour film from the semi-finished workpiece which would remain at the location of the transparent zone. Other methods known per se can be used instead of laser cutting to remove excess parts of the colour film.

Figure 15:
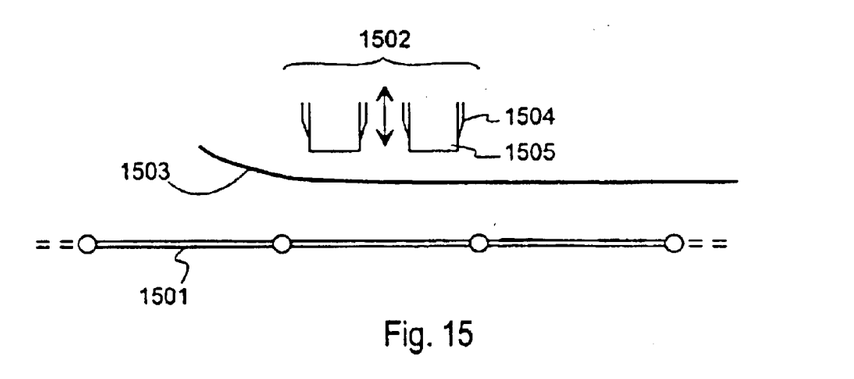
FIG. 15 shows an optional detail in the processing of a colour film.

FIG. 15 is a schematic view of a different kind of method for making colour-film impression on workpieces. The band 1501 of workpieces attached to the axes moves from the left to the right in the figure. At a certain point of the production process, a cutting and printing head 1502 is provided so that the colour film band 1503 passes between this and the band of workpieces 1501. When a given workpiece reaches the cutting and printing head 1502, it performs a series of vertical movements, while the cutting blades 1504 cut a piece with the desired shape and size from the colour film band 1503 and the printing surfaces 1505 press it into contact with the surface of the workpiece. The lower surface of the colour film is coated with glue, by means of which the desired colour film pattern adheres into position on the workpiece. A transport arrangement based on axes ensures that the workpieces are exactly aligned below the cutting and printing head 1502, so that the colour film adheres with high precision only to the desired areas of the workpiece.

Figure 16A:
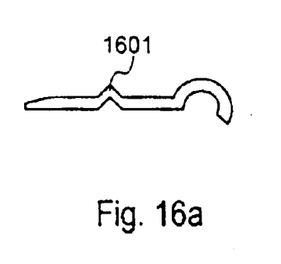
FIGS. 16a–16c show some ways of compensating for shrinkage of the workpiece and FIG. 17 shows a way of using inserts.
Figure 16B:
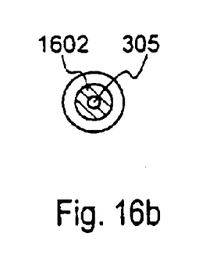
Figure 16C:
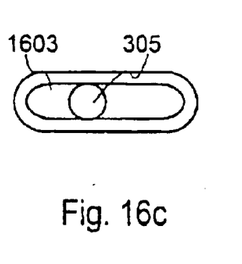

In the discussion above it has not been considered that injection-moulded bodies shrink to some extent while cooling. Since the distance between the axes is constant in the chain, shrinkage of a workpiece attached to two successive axes in a direction perpendicular to the axes will generate strain in the workpiece, the axes and the chains. FIGS. 16*a*, 16*b* and 16*c* show a number of arrangements that enable detrimental shrinkage effects to be prevented. In FIG. 16*a*, the fastening member in the workpiece has been formed with a curve 1601 or any other mechanical design with such strength properties that it stretches when the workpiece shrinks. In this way, the effect of shrinkage is confined under control to a given point of the workpiece. FIG. 16*b* shows a bushing located at the end of the axis 305 for the attachment of the axis to the chain; integrated in the bushing is a sleeve 1602 made of an elastic material, which yields as the workpiece shrinks. FIG. 16*a* shows a fastening member in the chain having an elliptic hole 1603 in which the axis 305 is allowed to move freely over a given distance in the longitudinal direction of the chain.

Only such embodiments have been described above which comprise two chains and a continuous axis between these. An embodiment of the invention is conceivable which comprises one single chain, provided that the axes can be attached to this with adequate firmness. In addition, embodiments of the invention are conceivable, which comprise three or more chains in parallel. Depending on the moulds used, identical or different products can be injection moulded between the different chains.

Figure 17:
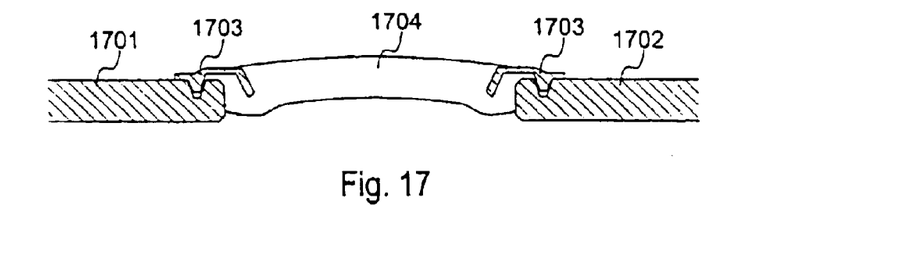

FIG. 17 is a schematic view of a solution in which the axes between two chains is discontinuous, consisting of two axis ends 1701 and 1702. In both these ends, the extremity facing the workpiece comprises a fastening design, in which a specific insert 1703 made of e.g. metal or hard plastic is placed before the injection moulding. When the workpiece 1704 is injection moulded, the material adheres to the insert 1703 during solidification so that the cent between the workpiece and the axis is provided at least partly by means of the insert after the injection-moulding operation.

The embodiments of the invention described above are given by way of example, and they have no limiting effect on the invention. Various additional features of the invention have been described in various conjunctions; these additional features can be freely combined to form various combinations.

What is claimed is:

1. A method for treating workpieces to be injection moulded in a production process, comprising steps for
    a) forming a workpiece by injection moulding so that during the injection moulding, the workpiece is attached to a given elongated transport arrangement by a first fastening member and a second fastening member,
    b) moving the workpiece forward in the production process by means of the elongated transport arrangement,
    c) detaching the first fastening member of the workpiece from the elongated transport arrangement, and
    d) shifting the workpiece supported by the second fastening member remaining between this and the transport arrangement into position where the workpiece is substantially outside a plane defined by the transport arrangement to which the workpiece is fastened.

2. A method as defined in claim 1, wherein in step a), the fastening members are formed in the workpiece, at least part of the fastening members enclosing at least partly a given axis included in the transport arrangement.

3. A method as defined in claim 2, wherein in step c), the first fastening member is detached, which partly enclosed a given axis in the transport arrangement, by detaching the enclosing portion from the axis by pressing.

4. A method as defined in claim 1, wherein in step a), the fastening members are formed in the workpiece, at least part of which lie on a given axis in the transport arrangement by force of gravity.

5. A method as defined in claim 4, wherein in step c), the transport arrangement is shifted into a position where the first fastening member having lain on the axis is drawn by force of gravity into a different direction than towards the axis.

6. A method as defined in claim 1, wherein after step d), the workpiece attached to the transport arrangement by the second fastening member is subjected to surface treatment by immersion into a surface-treatment agent without the transport arrangement getting into contact with the surface-treatment agent.

7. A method as defined in claim 1, wherein in step a), the workpiece is formed by multi-step injection moulding so that in the first injection-moulding step, the workpiece is attached to a given elongated transport arrangement, by means of which it is transferred to the following injection-moulding step.

8. A method as defined in claim 1, wherein between steps a) and b), it comprises a step for detaching the injection-moulded workpiece from the injection mould by pressing, simultaneously and into the same direction, given ejection pins in the workpiece and those parts of the transport arrangement to which the workpiece is attached.

9. A method as defined in claim 1, wherein it comprises, after step b), a step for exact positioning for aligning the workpiece accurately with the parts of the transport arrangement to which the workpiece is attached.

10. A method as defined in claim 9, wherein the step for exact positioning of the workpiece comprises a step for removing film-like material from the workpiece by cutting.

11. A method as defined in claim 9, wherein the step for exact positioning of the workpiece comprises a step for fixing at least one pattern of film-like material to the workpiece.

12. A method as defined in claim 1, further comprising before step a) a step for placing an insert in the injection mould, the insert having been adapted to be fastened to the transport arrangement, and the workpiece being formed in step a) so as to be fastened to the insert.

13. An apparatus for treating workpieces to be injection moulded in a production process, the apparatus comprising
    a mould for producing workpieces by injection moulding
    an elongated transport arrangement for moving the injection-moulded workpieces forwards in the production process;
    the mould having been disposed in the apparatus to form first and second fastening members in the workpieces for attachment of the workpieces to the transport arrangement,
    means for detaching the first fastening member of the workpieces from the transport arrangement while the second fastening member remains attached,
    means for shifting such a workpiece, whose first fastening member fastened to the transport arrangement has been detached, into a position relative to the transport arrangement to which the workpiece is fastened, where it is substantially outside a plane defined by the transport arrangement.

14. An apparatus as defined in claim 13, wherein
    the transport arrangement comprises at least one elongated band or chains and a plurality of axes transversely attached to this
    the mould has been disposed to form fastening members in the work-pieces for fastening each workpiece to two successive axes
    the means for detaching the first fastening member of the workpiece from the transport arrangement have been disposed to detach the first fastening member of the workpiece from one of the two axes to which the workpiece is fastened.

15. An apparatus as defined in claim 14, wherein the means for shifting a workpiece whose first fastening member fastened to the transport arrangement has been detached into a position relative to the transport arrangement where it is substantially outside a plane defined by the transport arrangement comprise means for shifting the transport arrangement in a position where each workpiece is suspended by one axis in a direction substantially perpendicular to the transport arrangement.

16. An apparatus as defined in claim 15, wherein it comprises a surface-treatment vessel for wetting the workpiece suspended substantially perpendicularly to the transport arrangement with the surface-treatment agent provided in the surface-treatment vessel.

17. An apparatus as defined in claim 14, wherein the axes comprise fastening designs for fastening the axes to the elongated band or chain and/or for fastening the workpieces to the axes.

18. An apparatus as defined in claim 14, further comprising means for ensuring a play for the axes in the longitudinal direction of the band or the chain as they are fastened to the elongated band or chain.

19. An apparatus as defined in claim 13, further comprising, connected with the mould, transfer jaws disposed to transfer the transport arrangement when the mould is open, and to release their grip of the transport arrangement and to move in a direction opposite to the direction of movement of the transport arrangement when the mould is closed.

20. An apparatus as defined in claim 19, further comprising means in the mould for forming ejection pins in the workpiece and a detaching unit in connection with the mould for removing the workpiece from the mould by pressure of the ejection pins, the detaching unit and at least one of the transfer jaws having been disposed to operate in synchronisation so that, as the detaching unit ejects the ejection pins in a given direction, said transfer jaw presses the transport arrangement in the same direction.

21. An apparatus as defined in claim 13, further comprising a pouring channel in connection with the mould for feeding material into the mould, with the spine formed at the pouring channel being one of the means for fastening the workpiece to the transport arrangement.

22. An apparatus as defined in claim 13, further comprising, in connection with the mould, a hot pouring channel for feeding material into the mould so that no sprue is formed at the pouring channel.

23. An apparatus as defined in claim 13, wherein the mould comprises at least two mould cavities in succession in the direction of movement of the transport arrangement to carry out multi-step injection moulding, the apparatus comprising means for fitting a semi-finished workpiece formed in the first mould cavity into position in the second mould cavity in alignment with the transport arrangement.

24. An apparatus as defined in claim 13, further comprising means for adding a film-like material on the surface of the workpiece, and means for fitting the workpiece, in alignment with the transport arrangement, into position in the process step where film-like material is applied to or removed from the surface of the workpiece.

* * * * *